United States Patent [19]

Schmidt et al.

[11] Patent Number: 5,125,721
[45] Date of Patent: Jun. 30, 1992

[54] ANTI-SKID BRAKE SYSTEM FOR A VEHICLE

[75] Inventors: Guenther Schmidt, Tamm-Hohenstange; Roland Holzmann, Stuttgart; Alfred Sigl, Serheim; Karl-Heinz Willmann, Freiberg/N; Wolf-Dieter Jonner, Beilstein Schmidhausen, all of Fed. Rep. of Germany

[73] Assignee: Robert Bosch GmbH, Stuttgart, Fed. Rep. of Germany

[21] Appl. No.: 654,987

[22] Filed: Feb. 14, 1991

[30] Foreign Application Priority Data

Feb. 17, 1990 [DE] Fed. Rep. of Germany ....... 4005109
Nov. 20, 1990 [DE] Fed. Rep. of Germany ....... 4036940

[51] Int. Cl.$^5$ ............................................. B60T 13/00
[52] U.S. Cl. .............................. 303/9.62; 303/DIG. 4; 303/116 R; 303/113 AP
[58] Field of Search ......... 303/DIG. 4, 9.62, 113 AP, 303/116 R, 113 SS, 116 SP, 116 WP, 116 PC, 119 R

[56] References Cited

U.S. PATENT DOCUMENTS

| | | | |
|---|---|---|---|
| 3,907,377 | 9/1975 | Mayer | 303/113 AP |
| 4,484,784 | 11/1984 | Leiber | 303/DIG. 4 |
| 4,550,954 | 11/1985 | Leiber | 303/DIG. 4 |
| 4,708,225 | 11/1987 | Feldman et al. | 303/DIG. 4 |
| 4,717,208 | 1/1988 | Kubota | 303/9.62 |
| 4,740,039 | 4/1988 | Hattwig | 303/113 AP |
| 4,943,123 | 7/1990 | Takeda et al. | 303/113 AP |
| 4,971,401 | 11/1990 | Arikawa | 303/116 R |
| 5,039,175 | 8/1991 | Holzmann et al. | 303/116 R |

Primary Examiner—Joseph F. Peters, Jr.
Assistant Examiner—Christopher P. Ellis
Attorney, Agent, or Firm—Edwin E. Greigg; Ronald E. Greigg

[57] ABSTRACT

A vehicle brake system having at least two brake pressure lines, via which a master brake cylinder communicates with wheel brake cylinders, at least one valve is incorporated in each brake pressure line to close the brake pressure lines in the event of anti-skid control. Each brake pressure line is also assigned a return pump, which bypasses the valve. At least one valve, in the currentless state or with the absence of pressure buildup in a brake pressure line, blocks this brake pressure line and communicates with a control unit for pulsed opening upon pressure buildup in the brake pressure line. Because of the additional disposition of a pressure valve and check valve in a bypass around the pulsed valve, expensive pressure reducers are dispensed with, with little additional expense in the anti-skid control system. Even if the anti-skid control system fails, stability during braking is assured.

29 Claims, 6 Drawing Sheets

ANTI-SKID BRAKE SYSTEM FOR A VEHICLE

BACKGROUND OF THE INVENTION

The invention relates to a vehicle brake system having at least two brake pressure lines, via which a master brake cylinder is connected to wheel brake cylinders, as defined hereinafter. Such brake systems are known in a great number of vehicles. To generate the brake pressure and thus the braking action, a master brake cylinder is acted upon with pressure with the aid of a foot pedal. This pressure is then passed on to wheel brake cylinders via the corresponding brake pressure lines, causing a closure of brake calipers, for instance.

To preclude wheel locking and a resultant impairment of performance and controllability of a vehicle, modern brake systems today additionally have built-in anti-lock or anti-skid control systems, also known as ABS, which regulate the brake pressure acting upon the wheel brake cylinders. To this end, there are sensors on the wheels that recognize locking of a particular wheel and report it to a control unit. In the event of anti-lock control, a magnetic valve incorporated into the brake pressure line is switched to the blocking position, and brake fluid is withdrawn from the wheel brake cylinders, for instance via a return pump, thereby relieving these wheel brake cylinders. In the normal operating state, in which there is no current to these so-called ABS magnet valves, the valves are switched on, so that there is continuous communication between the master brake cylinder and the wheel brake cylinder. Only during the anti-lock control is this communication severed, or else from the wheel brake cylinders some other connection is opened for pressure reduction.

It is also known that a dynamic shift in axle load occurs during braking. This depends on the magnitude of the braking deceleration and on the static distribution of the load on the vehicle and the height of its center of gravity. During straight ahead braking, the front wheels are loaded more heavily than the rear wheels. For safety reasons it is known to use a plurality of brake circuits, the distribution of brake circuits can be selected as separate for the front and rear axles, as an example, so that if the front axle brake circuit fails, for instance, then the rear axle can still be braked, and vice versa. Diagonal brake circuit distributions are also known, in which one front wheel and a diagonally opposed rear wheel are each assigned to the same brake circuit. In most vehicles the brakes are designed such that the best performance during braking results for medium deceleration. In major deviations from mean values, either the rear wheel can lock, causing the vehicle to spin out, or the front wheel are locked, so that the vehicle can no longer be steered.

To prevent overbraking of the rear axle, particularly, and the resultant skidding of the vehicle, in many vehicles having hydraulic brake systems, a pressure reducer is built in the lines between the rear wheel brake cylinders and the master brake cylinder. It is intended to limit the brake pressure acting upon the rear wheel to a certain value.

In vehicles that are equipped with an anti-lock or anti-skid brake system, contrarily, if the pressure reducer is dispensed with, then although locking of a rear wheel is prevented, still the occurrence of brake slip at the rear axle earlier than at the front axle worsens the braking stability. To prevent this, and to assure vehicle stability in the event of failure of the anti-lock control system, and to achieve the brake performance required by law, pressure reducers are also provided in anti-lock brake systems. However, it is very time-consuming and labor-intensive to install the known pressure reducers.

OBJECT AND SUMMARY OF THE INVENTION

A brake system as defined herein has a substantial advantage that the installation of pressure reducers in the brake systems can be omitted, with little additional expense for controlling the anti-lock control systems. The result is that less tubing is needed, as well as less space for installation.

According to the invention, a magnet valve or valves interrupt the applicable brake pressure line to the wheel brake cylinders of one axle. As a rule, this would be the rear axle of a vehicle. The interruption is effected in the normal operating state, without current to the valve, in other words when no brake pressure is operative in the applicable brake pressure line.

To attain optimal braking and not overload the front axle brake, however, the closed valve is triggered upon each actuation of the foot pedal of the brake and is opened in pulsed fashion. This successive pulsed opening of the valve enables a slow approximation to a possibly attainable locking pressure, thereby reducing a tendency of the vehicle to oversteer. An important factor here is that a desired ratio between the opening and closing time of the valve, or in other words in the pulse-to-interval ratio is defined by the control unit. The number of pulsed openings is also significant. Depending on the desired deceleration of the vehicle, which is for instance signaled by a difference in the brake pressure, a longer-lasting opening of the valve, or an opening in faster succession, upstream of the applicable wheel brake cylinder takes place. For a desired less-pronounced vehicle deceleration, contrarily, less pressure, or a slower pressure, can be built up in the wheel brake cylinder.

The present invention also makes it possible to control the brake system depending on the load status of the vehicle. For example, if a relatively high rear axle load is ascertained by a sensor, then in a braking event, pressure should be built up relatively fast, and/or a relatively high pressure should be built up in the brake line to the rear axle or in the brake lines to both rear axle brake cylinders. Conversely, if there is a low rear axle load, it is only necessary to build up a slight pressure, or to build up the pressure slowly.

It is also within the scope of the invention that by means of suitable pressure sensors on at least one front wheel and at least one rear wheel, the optimal brake pressure ratio in the brake pressure lines for the vehicle deceleration is established upon each braking event. This option also has a very favorable effect on the overall brake performance of the vehicle.

In a further embodiment of the invention, the valve, which is controlled in pulsed fashion, is assigned a check valve and a pressure valve in a bypass, the pressure valve receiving a control pressure via a communication downstream of the return pump. By this additional incorporation of a check valve with a predetermined response pressure, it continues to be assured that if the anti-lock control fails, the function of a pressure reducer is in auxiliary fashion additionally taken on by the check valve, so that the pressure at the rear wheel is reduced by a certain value. If the anti-lock system is intact, contrarily, a pressure reducer is not needed, since the anti-lock system prevents the rear axle from locking before the front axle. By the triggering of the magnet valves, the pressure at the rear wheel brake calipers can be raised above the reduction pressure level.

In the anti-lock mode, to enable a pressure reduction in the wheel brake cylinders of the rear wheels to below the response pressure of the check valve, the bypass around the pulsed valve, into which bypass the pressure valve is incorporated, is closed by means of an additional hydraulic control function. As a result in normal operation with intact anti-skid control, the brake fluid via the pressure valve is interrupted.

Correspondingly, in a further embodiment of the invention, a pressure reducing function can be attained if the valve in the brake pressure line, in a bypass, is assigned a normally open pressure reducing valve, which receives one control pressure via a communication from the wheel brake cylinder and one control pressure via a communication downstream of the return pump.

A brake circuit failure can also be recognized via a switch for the brake fluid level. In that case it appears practical for the triggering of the pulsed valve to be effected in the manner occurring upon relatively hard braking; that is, a relatively high pressure buildup, or a relatively fast pressure buildup is produced in the wheel brake cylinder.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
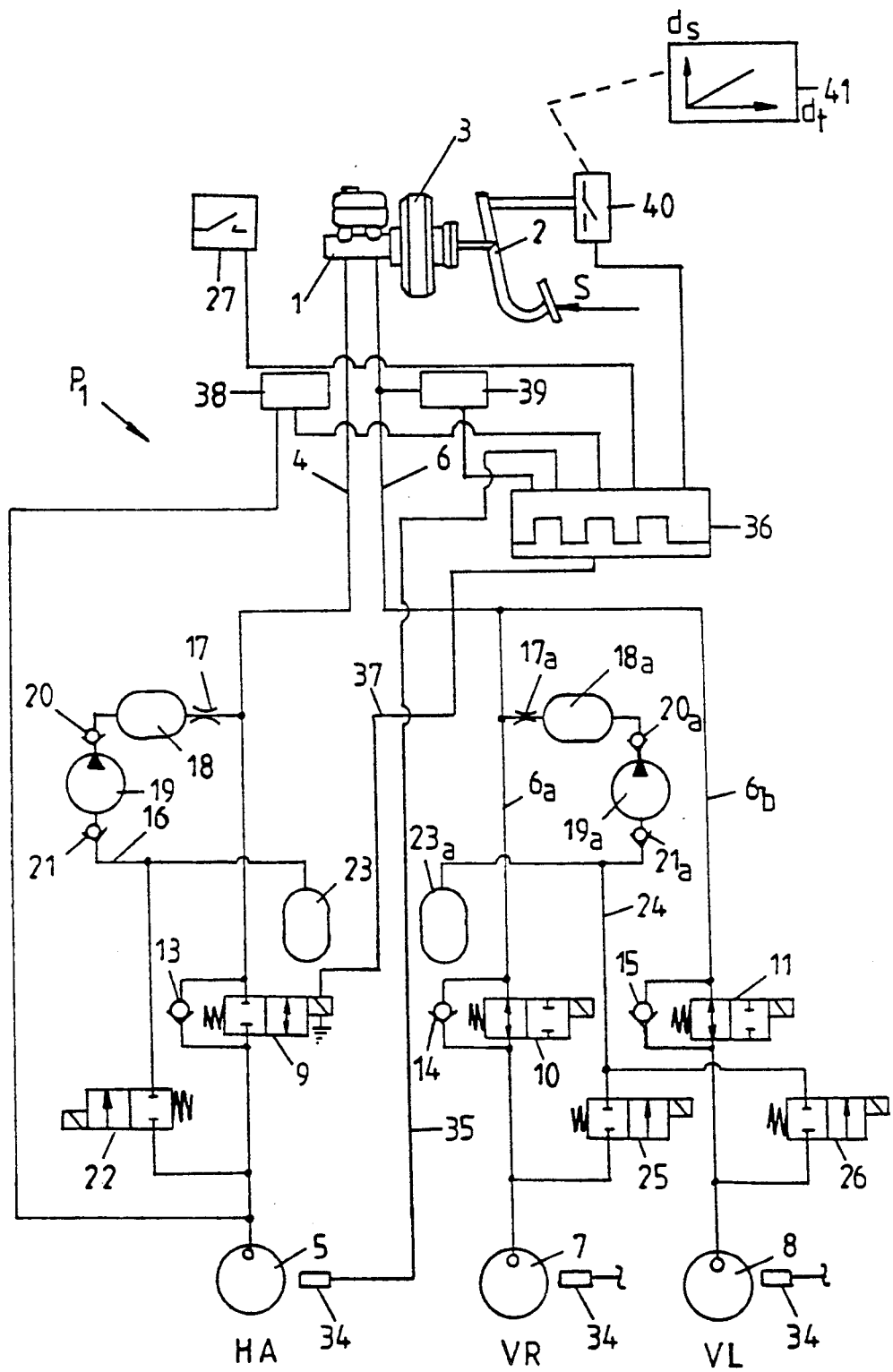
FIG. 1 is a block circuit diagram of a brake system with TT-type brake circuit distribution.

A brake system P1 as shown in FIG. 1 has a master brake cylinder 1, which can be acted upon with brake pressure by actuation of a brake pedal 2 via a brake booster 3 of a conventional type. From the master brake cylinder 1, a brake pressure line 4 leads to the wheels of a rear axle 5, and the corresponding wheel brake cylinders of both wheels of the rear axle 5 communicate with the brake pressure line 4.

A further brake pressure line 6 separately supplies the corresponding wheel brake cylinders of the right front wheel 7 and left front wheel 8. This kind of brake circuit distribution is known as TT-type brake circuit distribution.

One magnet valve 9, 10 and 11 for each circuit is incorporated into both the brake pressure line 4 and the branch lines 6a and 6b of the brake pressure line 6 for the right and left front wheels 7 and 8, respectively. Each of these magnet valves is also assigned a check valve 13, 14 and 15, respectively, in a bypass. The magnet valves 9, 10 and 11 have a blocking position and an open position in both directions.

Branching off from the brake line 4 between the master brake cylinder 1 and the magnet valve 9 is a branch line 16, in which a damper chamber 18 follows a throttle 17. This damper chamber 18 communicates with a return pump 19, which is bracketed on both sides by one-way check valves 20 and 21.

Downstream of the return pump 19 or check valve 21, the branch line 16 leads, via a magnet valve 22, back to the brake pressure line 4 between the magnet valve 9 and the rear axle 5. Via the branch line 16, pressure fluid can also be stored in a reservoir 23 between the check valve 21 and the magnet valve 22.

A similar arrangement is provided for the brake pressure line 6, or its branch lines 6a and 6b. However, in this case both magnet valves 10 and 11 are bypassed by a line 24 in which a corresponding throttle 17a, a damper chamber 18a, a return pump 19a having two check valves 20a and 21a, and an additional reservoir 23a are located. Downstream, however, the line 24a branches again and each branch communicates via an additional magnet valve 25 or 26 with the applicable branch line 6a or 6b downstream of the magnet valve 10 or 11.

Wheel rotation sensors 34 are assigned to both the rear axle and to the left and right of the front wheel. The wheel rotation sensor 34 on the rear axle has a line 35 in communication with an electrical signal pulsing element 36. By means of this pulsing element 36, the magnet valve 9 is triggered via an electrical control line 37.

Figure 7:
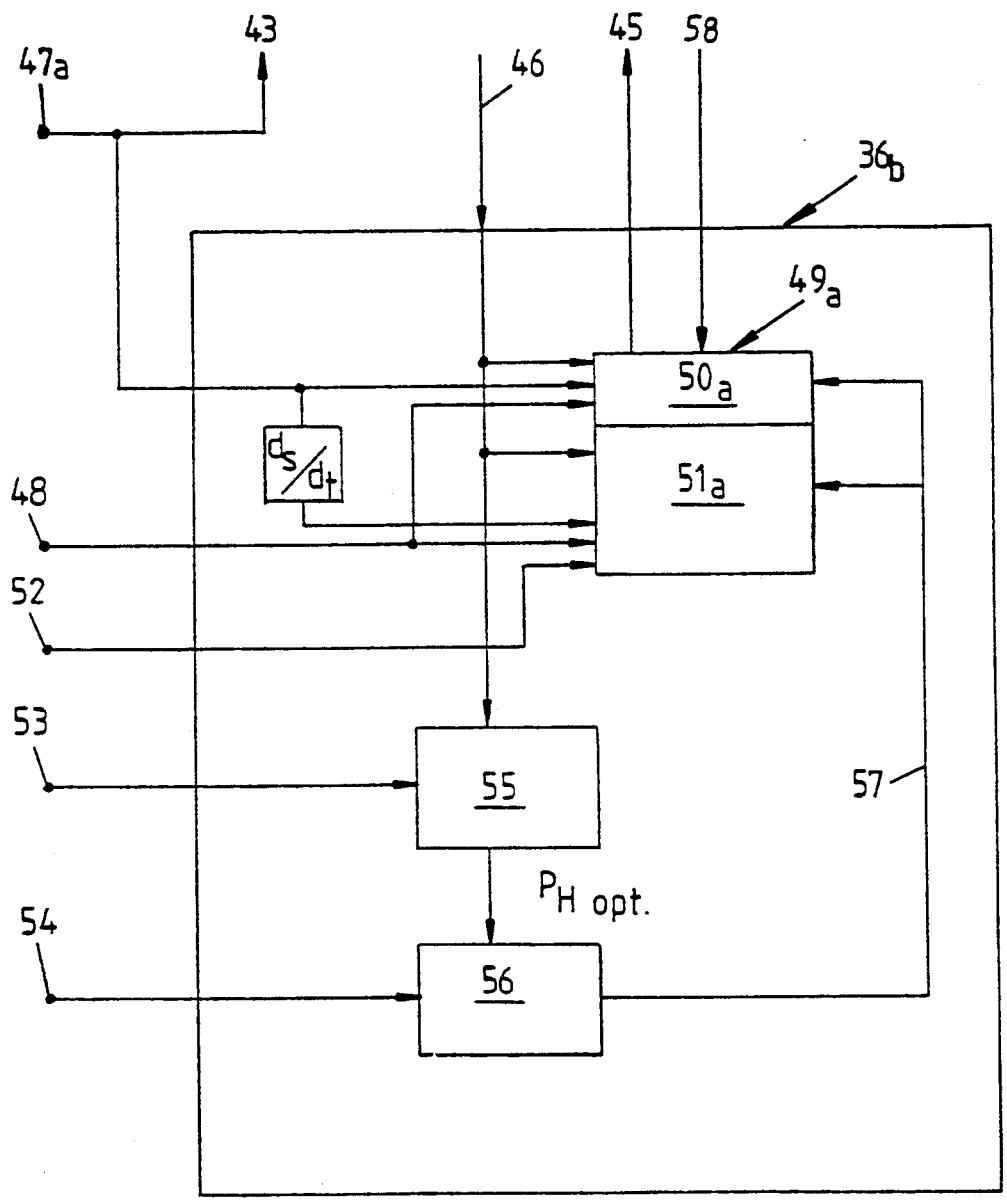
FIG. 7, a block circuit diagram of a further part of the control unit, in a different embodiment.

Both the brake pressure line 4 for the rear axle brake circuit and the brake pressure line 6 for the front axle brake circuit are each assigned pressure sensors 38 and 39, respectively. The pressure sensor 38 is connected to the brake line 4 between the rear axle 5 and the magnet valve 9. The pressure sensor 39 communicates toward the master brake cylinder with the brake pressure line 6 of the front axle brake circuit. These pressure sensors 38 and 39 likewise communicate with the pulsing element 36, and are used in an improved embodiment of the control unit as shown in FIG. 7.

Also provided on the brake pedal 2 is a brake light switch 40, which is likewise connected to the pulsing element 36. In an improved embodiment, however, a brake pedal travel sensor 41 is used, which ascertains the travel of the brake pedal 2 as a function of time.

Figure 4:
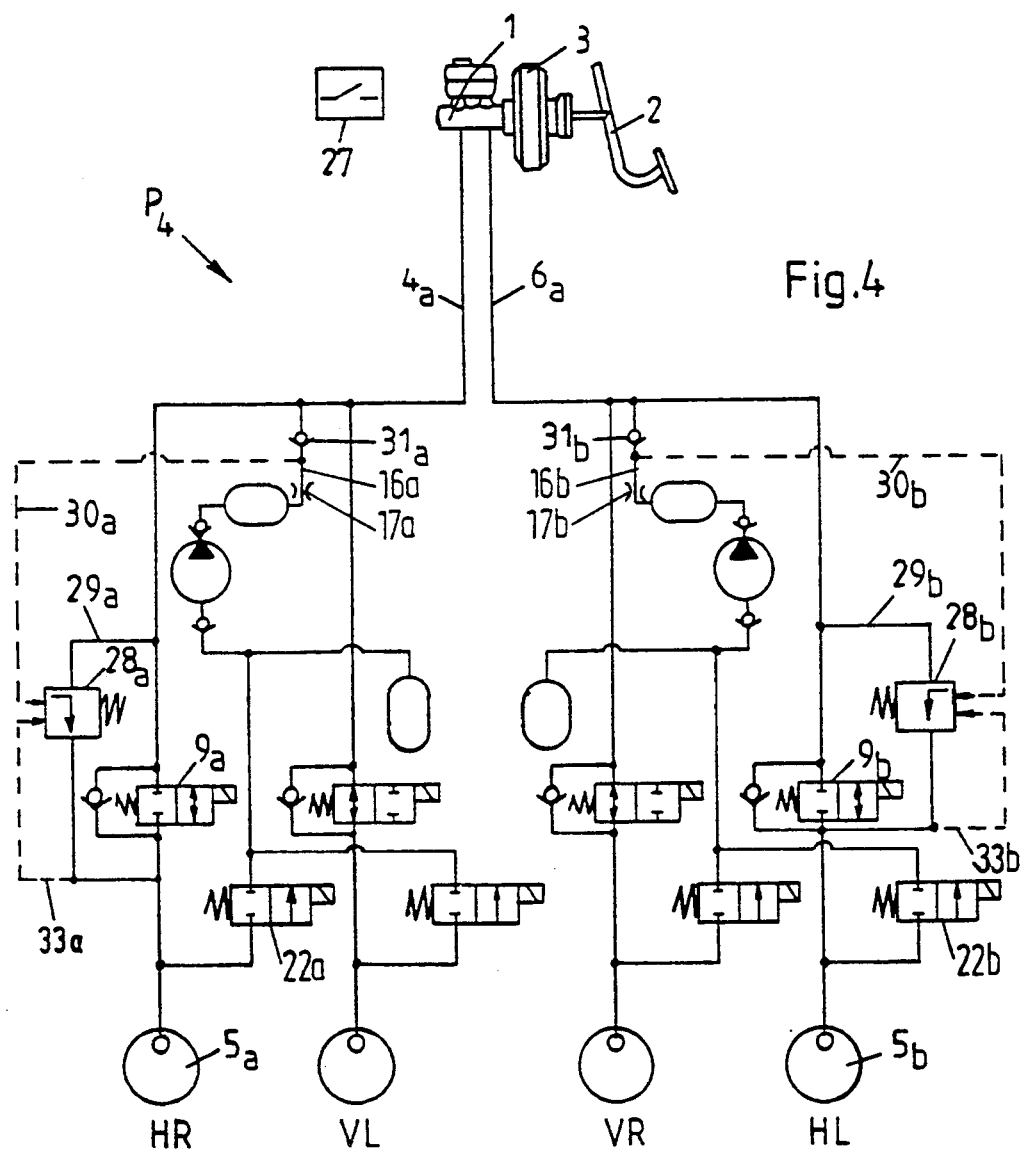
FIG. 4 is a block circuit diagram of a further embodiment of a brake system with K-type brake circuit distribution.
Figure 5:
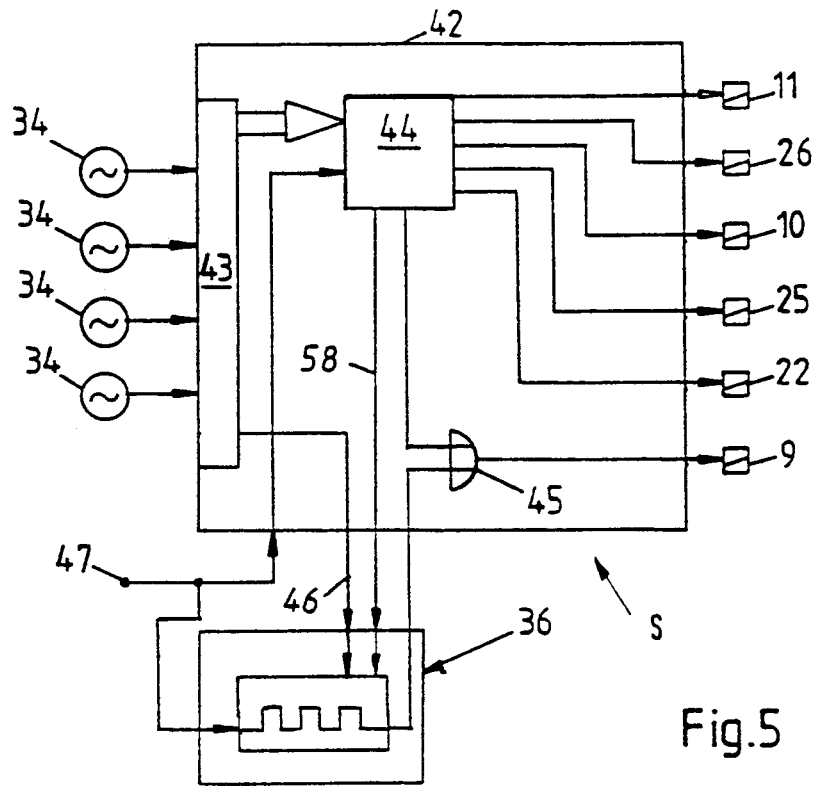
FIG. 5, a block circuit diagram for part of a control unit.

A corresponding control unit S for the brake system of the invention is shown in FIG. 5. In this control unit, there are four rotation angle sensors 34, as are required for the exemplary embodiment of a brake system of FIGS. 2 and 4. These sensors 34 are connected to a control block 42, in one zone 43 of which detection and conversion of the values of the rotation angle sensors 34 takes place. In this zone, a calculation of the wheel speed, the vehicle speed and the necessary vehicle deceleration is effected. From this zone 43, a triggering of ABS logic 44 is then effected, and this logic then in turn takes on the triggering of the various magnet valves 10, 11, 22, 25 and 26. The magnet valve 9 is triggered simultaneously, but in this case an OR linkage 45 also allows triggering by the pulsing element.

In the exemplary embodiment shown in FIG. 5, the pulsing element 36 receives its information from a connection 47 to the brake light switch 40. Via the connection 47, the brake light switch 40 is also connected to the ABS logic 44. A connection 46 is also provided between the zone 43 and the pulsing element 36. Via this line 46, an ascertained vehicle deceleration is imparted to the pulsing element. The line 58 carries the information from an active ABS control system to the pulsing element 36.

The mode of operation of the brake system of the invention is as follows:

When it is without electrical current, the magnet valve 9 for the wheel brake cylinders of the rear axle 5 is in the closed state, so that the brake pressure line 4 is blocked. The magnet valves 10 and 11 for the wheel brake cylinders of the right and left front wheels 7 and 8, respectively, however, are open.

If pressure is now exerted upon the brake pedal 2, causing pressure to be fed into the brake pressure lines 4 and 6, then the brake light switch 40 emits a signal to the pulsing element 36, and pulsed triggering of the magnet valve 9 occurs, whereupon this magnet valve 9 opens briefly and then closes again. This pulsed triggering of the magnet valve 9 provides for a slow approximation to a locking pressure that might be attained, and thus prevents a tendency of the vehicle to oversteer. In this simple exemplary embodiment, the brake light switch 40 thus starts the pulsing element 36 with constant pulses, for example. If a major vehicle deceleration is reported to the pulsing element 36 from the zone 43 over the line 46, then the length of the interval between pulses can be shortened via the pulsing element 36. During the ABS mode, the braking action is decoupled from the brake pressure exertion via the brake pedal 2. The pulsing element 36 is blocked via the line 58, since the ABS control of brake slip takes priority.

The pressure buildup is thus dependent on the pulse-to-interval ratio and on the number of pulses. Each time the brake is actuated, the magnet valve 9 is triggered with a defined pulse-to-interval ratio. If a high brake pressure in the brake line 4 and 6 means that fast vehicle deceleration is desired, for instance, then via the then-specified pulse-to-interval ratio, a fast and/or high pressure buildup in the wheel brake cylinders of the rear axle 5 is attained. Contrarily, if less pronounced vehicle deceleration is desired, then only little pressure may be built up, and/or the pressure may be built up only slowly, by controlling the pulse-to-interval ratio.

The vehicle deceleration intention can be calculated from a vehicle speed change caused by the brake pressure fed in via the brake pressure line 6.

Figure 6:
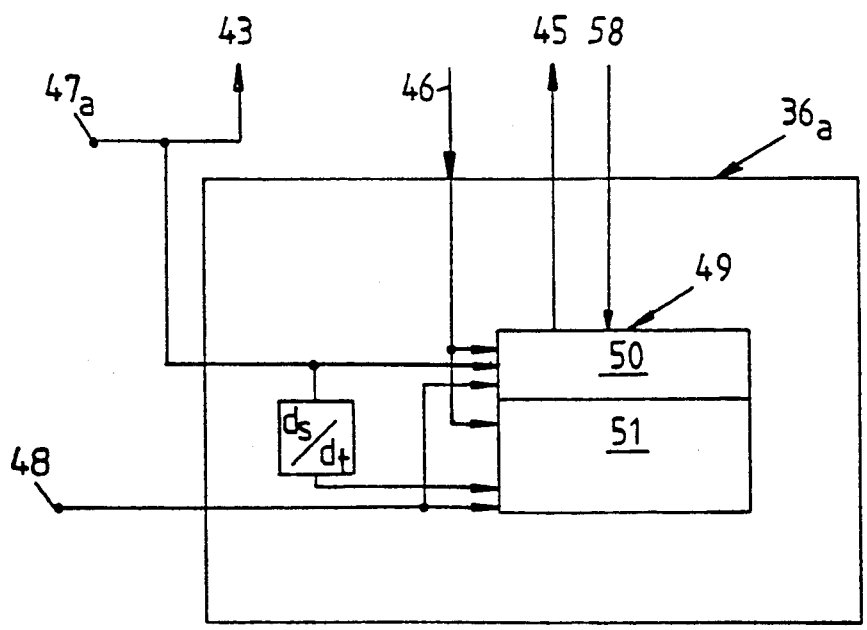
FIG. 6, a block circuit diagram of a further part of the control unit, in a different embodiment.

In a further exemplary embodiment of part of the control unit S shown in FIG. 6, the pulsing element 36a receives its trigger signal from the brake pedal travel sensor 41, in which a conversion of the brake pedal travel takes place. This brake pedal travel sensor 41, by a comparison of the brake pedal travel $d_s$ and the time $d_t$ required for this travel, recognizes a rapid pressure rise, which then results in pulse width modulation of the pulsing element 36a. As an alternative, however, pulse trains of the wheel rotation sensors can also be evaluated.

The pulsing element 36a is also connected to a connection 48, via which a rear axle load signal from a suitable sensor, not shown in detail, is input.

If there is a large rear axle load, then pressure in the wheel brake cylinder of the rear axle 5 is built up rapidly and/or a great deal of pressure is built up there, via the pulsed magnet valve 9, or if the rear axle load is small, then pressure is built up slowly, and/or little pressure is built up.

By means of the additional pressure sensors 38 and 39, an ideal brake force distribution can be attained in this way; that is, upon each braking event, the optimal brake pressure ratio for the vehicle deceleration is to be established at least one front wheel and at least one rear wheel.

The pulsing element 36a or its evaluation and control element 49, comprises two zones. The determination of the number of pulses is done in zone 50; the determination of the pulse-to-interval ratio is done in zone 51. Both zone 50 and zone 51 receive their signals from their connection 47a to the brake pedal travel sensor 41, the line 46 from the zone 43 and the connection 48 to a rear axle load sensor. However, only zone 50 has an output for the number of pulses, and the communication is established here to the OR linkage 45. The line 58 blocks the pulsing element triggering during the ABS mode.

The number of pulses is detected in zone 50 from the pedal travel, the vehicle deceleration and the rear axle load. If the pulses are constant, for example, the interval ratio is defined approximately as follows:

$$t_{interval} \sim \frac{1}{\text{vehicle deceleration, rear axle load}}$$

A further improved embodiment of a pulsing element 36b is shown in FIG. 7. Once again, the corresponding evaluation and control element 49a comprises a zone 50a for the number of pulses and a zone 51a for the pulse-to-interval ratio. Both zones receive a signal via the connection 47a from the brake pedal travel sensor 41. They also receive a signal via the connection 48 from a rear axle load sensor. A further connection is provided via the line 46 to the zone 43 in the control block 42, in which the desired vehicle deceleration is calculated.

An additional signal, however, is fed to the zone 51a of the pulse-to-interval ratio from a connection 52 to the brake fluid level switch 27. However, there are also two arithmetic units 55 and 56 inside the pulsing element 36; the arithmetic unit 55 is connected to the pressure sensor 39 for the front axle brake circuit, via a connection 53. Since this arithmetic unit 55 is likewise coupled with the zone 43 for the calculated vehicle deceleration, the calculation of an optimal rear axle pressure can be done in this arithmetic unit. This optimal rear axle pressure $P_{H\ OPT.}$ is then entered into the arithmetic unit 56, in which a comparison is made with a value arriving via a connection 54 from the pressure sensor 38 of the rear axle brake pressure line. A corresponding control signal is then fed via the line 57 to both the zone 50a for ascertaining the number of pulses and to the zone 51a for ascertaining the pulse-to-interval ratio. If the calculated optimal rear axle pressure is for instance higher than that ascertained, then the number of pulses is increased. Contrarily, if the optimal rear axle pressure calculated is equal to or less than the ascertained pressure, then no further pulse is allowed.

The signal from the brake fluid level switch 27 that represents a drop below a predetermined brake fluid level sets the interval time to zero. This means that the magnet valve 9 is open.

In the normal situation, in this exemplary embodiment as well, the number of pulses is ascertained from the pedal travel, the vehicle deceleration and the rear axle load. The ascertainment of the pulse-to-interval ratio, contrarily, is done from the vehicle deceleration, the rear axle load, and the comparison between the calculated optimal rear wheel brake pressure and the ascertained actual rear wheel brake pressure.

If a failure should arise in the brake pressure line 4, this circuit failure is recognized by the brake fluid level switch 27. In that case, triggering of the magnet valve 9 in the direction of a desired more-pronounced braking is automatically selected by the control unit.

In the event of anti-lock operation, the magnet valves 9, 10 and 11 are blocked in a known manner, and the corresponding wheel brake cylinders of the rear axle 5 and right and left front wheel 7 and 8 are relieved via the magnet valves 22, 25 and 26, respectively. The return of the brake fluid is effected first to the reservoirs 23 and 23a, and then via the return pumps 19 and 19a into the damper chambers 18 and 18a. These damper chambers 18 and 18a in turn communicate with the brake pressure lines 4 and 6, respectively, via the respective throttles 17 and 17a.

Figure 2:
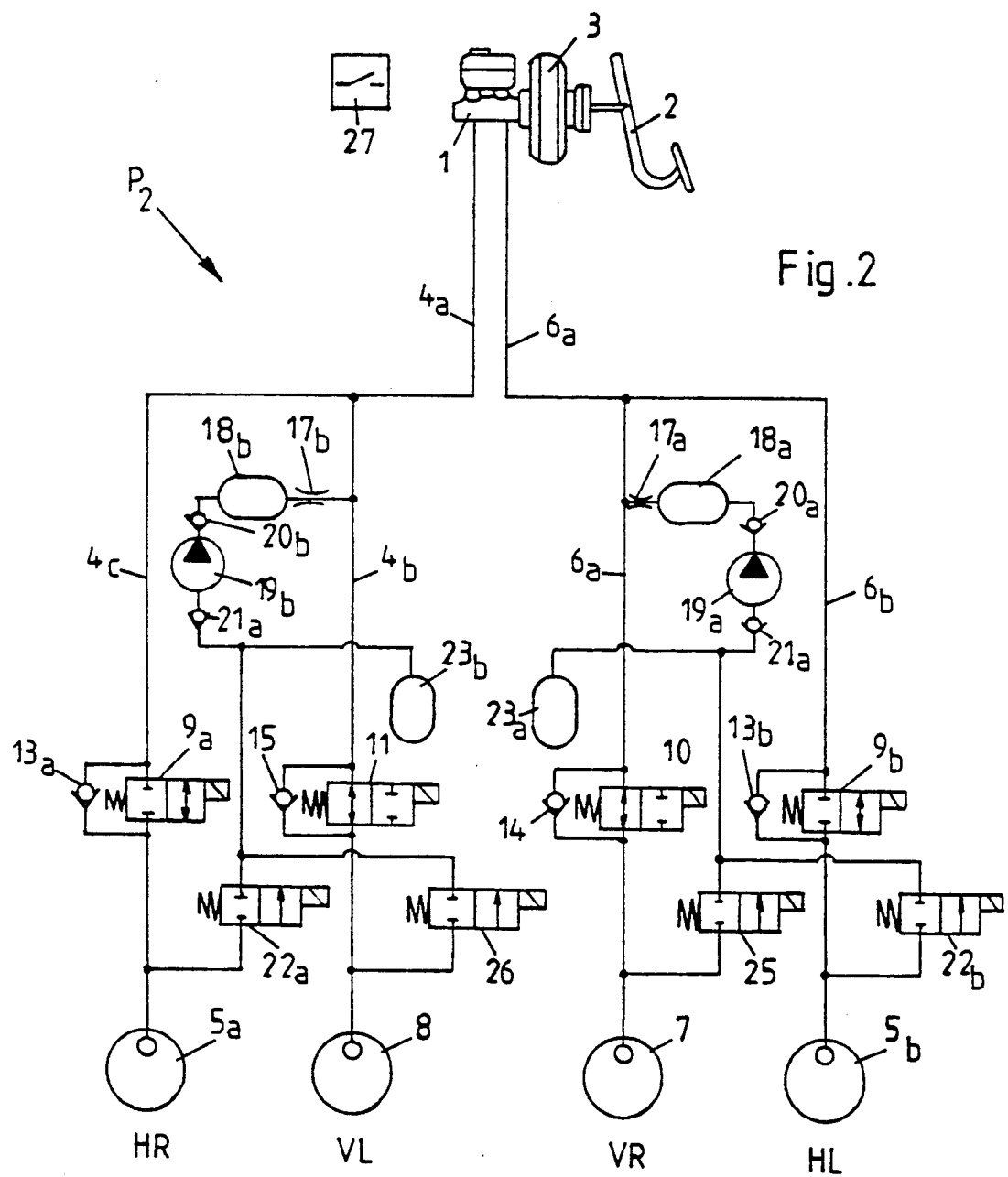
FIG. 2 is a block circuit diagram of a brake system With K-type brake circuit distribution.

The exemplary embodiment of a brake system P2 shown in FIG. 2, contrarily, has a separate triggering of the right and left rear wheel and a diagonal brake circuit distribution Va the brake pressure line 4a, the wheel brake cylinders of the right rear wheel 5a and left front wheel 8 are supplied with brake fluid. The brake pressure line 6a performs this same task for the wheel brake cylinders of the right front wheel 7 and left rear wheel 5b. Magnet valves, check valves, reservoirs and a return pump are incorporated into each brake pressure line 4a and 6a, as already described in FIG. 1 for the right and left front wheels. For this reason, the reference numerals in the brake lines 4a and 6a have been adapted accordingly. It should be emphasized that in the present exemplary embodiment shown in FIG. 2, a separate magnet valve 9a and 9b, respectively, is provided for both the right and the left rear wheel, and when it is without current it is in the closed state. Here, both magnet valves 9a and 9b are triggered in pulsed fashion, as described above. Otherwise, the functioning of the brake system is the same as that described above for FIG. 1.

Figure 3:
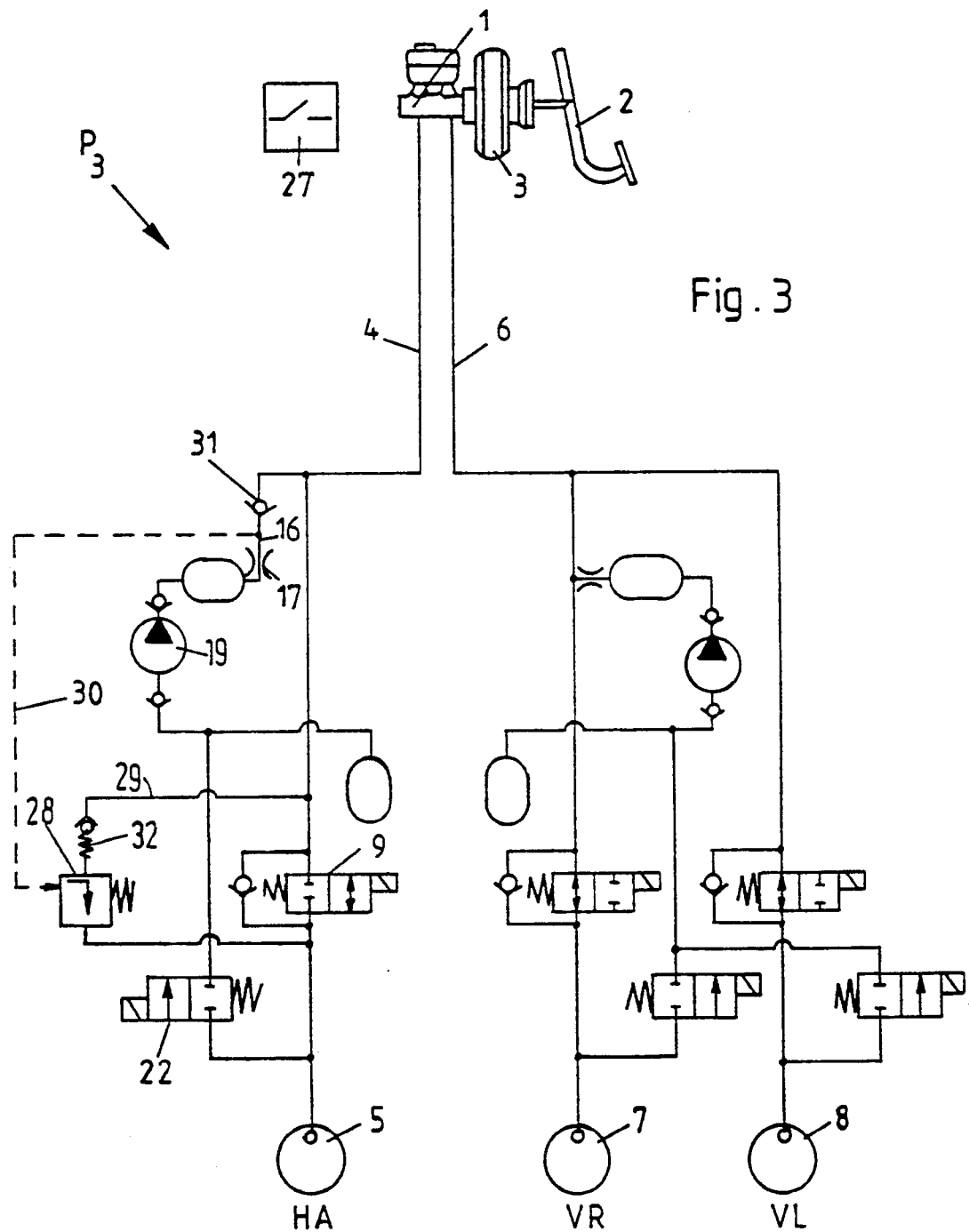
FIG. 3 is a block circuit diagram of a further embodiment of a brake system with TT-type brake circuit distribution.

A further exemplary embodiment of a brake system P3 according to the invention is shown in FIG. 3; the brake system of FIG. 1 can be substantially taken as its point of departure. For this reason, the description of FIG. 1 is understood to apply as a point of departure here. However, unlike FIG. 1, in this case the magnet valve 9 in the brake pressure line 4 for the wheel brake cylinders of the rear axle 5 is assigned a springloaded check valve 32 and a pressure valve 28 in a bypass 29 around the magnet valve 9. The check valve 32 and the pressure valve 28 can have a flow through them in the direction from the master brake cylinder 1 to the wheel brake cylinders of the rear axle 5. In the flow direction, the pressure valve 28 is downstream of the check valve 32. The check valve 32 is spring-loaded and opens at a response pressure of 50 bar, for example. The pressure valve 28 has a control line 30 to the branch line 16 between the throttle 17 and also has a further check valve 31. The pressure valve 28 is normally open; it closes counter to spring force at a control pressure of 30 bar, for example. Thus, the response pressure of the check valve 32 is higher than the control pressure at which the pressure valve 28 closes.

This additional incorporation of a check valve 32 and a pressure valve 28 assures that if the magnet valve 9 fails and if the anti-control system fails, the wheel brake cylinders of the rear axle 5 will be supplied with brake fluid. In this respect, the check valve 32 adopts the function of a pressure reducer in auxiliary fashion, in that the pressure at the rear axle 5 is reduced by the response pressure of the check valve. Once these values are attained, the check valve 32 passes the pressure fed into the brake pressure line 4 and on to the wheel brake cylinders of the rear axle 5.

In order that the pressure in the wheel brake cylinders of the rear axle 5 can be reduced by the magnet valve 22 to a value below the set response pressure of the check valve 32 during an anti-lock control event, the pressure valve 28 must be closed during ABS operation. This is attained via the control line 30.

All that the check valve 31 performs is that during normal braking operation no brake pressure acts upon the pressure valve 28 via the line 30. In this way, only a control pressure in the branch line 16 can be definitive for the pressure valve 28 during ABS operation.

According to FIG. 4, a brake system P4 is now shown, with a diagonal brake circuit distribution as in FIG. 2. The right and left rear wheel 5a and 5b are therefore each assigned to a different brake circuit. The difference from FIG. 2, however, is that one pressure reducing valve each 28a and 28b are disposed in a corresponding bypass 29a and 29b around the respective magnet valve 9a and 9b. Each of the pressure reducing valves 28a and 28b has a respective control line 30a and 30b to the corresponding branch line 16a and 16b between the throttle 17a and 17b and a further check valve 31a and 31b. A control line 38a and 38b also originates at the respective pressure reducing valve 28a and 28b and leads to the part of the bypass 29a and 29b toward the wheel brake.

By using this kind of pressure reducing valve 28a and 28b, it is assured on the one hand that if the magnet valve 9a or 9b fails, the wheel brake cylinders of the rear axle wheels 5a and 5b will be supplied with brake fluid. On the other hand, if the anti-skid control fails, the pressure reducing valve 28a and 28b in auxiliary fashion adopts the function of a pressure reducer, by limiting the pressure at the rear axle to a certain value. Once this value is attained, then the pressure reducing valve 28a and 28b closes.

In order that, during an anti-skid control event, the pressure in the wheel brake cylinders of the rear wheels 5a and 5b can be reduced by the magnet valve 22a and 22b to a value below the set, pressure reduction value, the pressure reducing valve 28a and 28b must be closed during the ABS mode. This is achieved via the control line 30a or 30b.

Once again, the check valve 31a and 31b has the sole function of assuring that during normal braking, no brake pressure acts upon the pressure reducing valve 28a or 28b via the line 30a or 30b. In this way, only a control pressure in the branch line 16a or 16b can be definitive during the ABS mode for the pressure limiting valve 28a and 28b.

The control of the brake system of FIGS. 3 and 4 is effected by control units S as described for FIG. 1.

Unlike the exemplary embodiment shown in FIG. 3, a pressure reducing valve 28a as arranged in FIG. 4, parallel to the valve 9a disposed in the brake pressure line 4. can also be used in the brake system P3. Conversely, the pressure valve 28 and check valve 32 of FIG. 3 can be disposed parallel to the valves 9a and 9b in the brake pressure lines for the rear wheels 5a or 5b of the brake system P4 of FIG. 4.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A vehicle anti-skid control brake system having at least one first brake pressure line and at least one second brake pressure line via which a master brake cylinder communicates with wheel brake cylinders, at least one first directional control valve is incorporated into said at least one first brake pressure line for closing the at least one first brake pressure line in the event of an anti-skid control, at least one second directional control valve is incorporated into said at least one second brake pressure line for closing the at least one second brake pressure line in the event of an anti-skid control, said at least one first brake pressure line is assigned a first return pump which bypasses the at least one first directional control valve, said at least one second brake pressure line is assigned a second return pump which bypasses the at least one second directional control valve, said at least one first directional control valve is an at least one first magnetic controlled valve (9), which in a currentless state as well as if pressure is absent in said at least one first brake pressure line (4), blocks said at least one first brake pressure line (4) and communicates with a control unit (S) which triggers said at least one first magnetic controlled valve in pulsed fashion for opening said at least one first magnetic controlled valve, and said at least one second directional control valve is an at least one second magnetic control valve (10, 11), which in a currentless state as well as if pressure is absent in said at least one second brake pressure line (6a, 6b), blocks said at least one second brake pressure line (6a, 6b) and communicates with said control unit S which triggers said at least one second magnetic control valve in pulsed fashion for opening said at least one second magnetic valve.

2. A brake system as defined by claim 1, in which said at least one first directional control valve (9) is assigned a pressure control valve (28) in a bypass (29), which is normally open and receives a control pressure via a control line (30) downstream of said first return pump (19), and that a check valve (32) is disposed in the bypass (29) upstream in the flow direction from the pressure control valve (28).

3. A brake system as defined by claim 1, in which the at least one first directional control valve (9a) is assigned a normally open pressure reducing valve (28a) in a bypass (29a), which receives one control pressure via a control line (33a) from the wheel brake cylinder and one control pressure via a control line (30a) downstream of the first return pump.

4. A brake system as defined by claim 1, in which the control unit (S) is connected electrically to a brake light switch (40) in order to receive a control signal, and the at least one first directional control valve is opened upon actuation of the brake light switch.

5. A brake system as defined by claim 2, in which the control unit (S) is connected electrically to a brake light switch (40) in order to receive a control signal, and the at least one first dimensional control valve is opened upon actuation of the brake light switch.

6. A brake system as defined by claim 3, in which the control unit (S) is connected electrically to a brake light switch (40) in order to receive a control signal, and the at least one first dimensional control valve is opened upon actuation of the brake light switch.

7. A brake system as defined by claim 1, in which the control unit (S) is connected electrically to a brake pedal travel sensor (41) to receive a control signal, and the at least one first dimensional control valve is opened as a function of the brake pedal travel.

8. A brake system as defined by claim 2, in which the control unit (S) is connected electrically to a brake pedal travel sensor (41) to receive a control signal, and the at least one first dimensional control valve is opened as a function of the brake pedal travel.

9. A brake system as defined by claim 3, in which the control unit (S) is connected electrically to a brake pedal travel sensor (41) to receive a control signal, and the at least one first dimensional control valve is opened as a function of the brake pedal travel.

10. A brake system as defined by claim 4, in which the control unit (S) is connected electrically with a rear axle load sensor for ascertaining a rear axle load.

11. A brake system as defined by claim 7, in which the control unit (S) is connected electrically with a rear axle load sensor for ascertaining a rear axle load.

12. A brake system as defined by claim 4, in which the control unit (S) is connected electrically to a brake fluid level switch (27).

13. A brake system as defined by claim 7, in which the control unit (S) is connected electrically to a brake fluid level switch (27).

14. A brake system as defined by claim 10, in which the control unit (S) is connected electrically to a brake fluid level switch (27).

15. A brake system as defined by claim 4, in which the control unit (S) is connected electrically to pressure sensors (38, 19) for the front and rear axle brake circuits.

16. A brake system as defined by claim 7, in which the control unit (S) is connected electrically to pressure sensors (38, 39) for the front and rear axle brake circuits.

17. A brake system as defined by claim 10, in which the control unit (S) is connected electrically to pressure sensors (38, 39) for the front and rear axle brake circuits.

18. A brake system as defined by claim 12, in which the control unit (S) is connected electrically to pressure sensors (38, 39) for the front and rear axle brake circuits.

19. A brake system as defined by claim 1, in which the control unit (S) has a control block (42) with a zone (43) for ascertaining a deceleration of the vehicle, and an anti-skid brake system logic means (44) for triggering and controlling the said at least one first and second magnetic control valves (9, 10, 11) as well as magnet valves (22, 25, 26) of the anti-skid control brake system, and this control block (42) is assigned a pulsing element (36).

20. A brake system as defined by claim 19, in which the pulsing element (36) is connected electrically to the at least one first directional control valve (9) via a signed control linkage (45), and another connection of which leads to the anti-skid brake system logic means (44).

21. A brake system as defined by claim 20, in which the pulsing element (36b) is a part of an arithmetic unit (55) for calculating an optimal rear axle pressure ($P_H$ $_{OPT.}$) from electrical signals produced by a pressure sensor (39) for a front axle brake circuit (6) and the vehicle deceleration, and this arithmetic unit (55) is followed by a second part of an arithmetic unit (56) for comparison of a calculated optimal rear axle brake pressure with an actual rear axle brake pressure ascertained by the pressure sensor (38), the second arithmetic unit (56) having a connection (57) to a zone (50a) of an evaluation and control element (49a) for determining a number of pulses and to a zone (51a) of said evaluation and control element for determining a pulse-to-interval ratio.

22. A brake system as defined by claim 1, in which via a pulse-to-interval ratio during a major vehicle deceleration, high pressure is built up quickly, while at slight vehicle deceleration, pressure is built up only slowly.

23. A brake system as defined by claim 1, in which high pressure is built up, if there is a long rapidly increased pedal travel, while pressure is built up only slowly if there is short increasing pedal travel.

24. A brake system as defined by claim 1, which includes a load state sensor for detecting a load state of the vehicle, and a pulse-to-terminal ratio is subsequently varied.

25. A brake system as defined by claim 24, in which if there is a large rear axle load, pressure is built up quickly, and if there is a small rear axle load, pressure is built up slowly at the rear axle.

26. A brake system as defined by claim 1, which includes at least one pressure sensor (38, 39) on at least one front wheel and at least one rear wheel, and an optimal brake pressure ratio for a deceleration of the vehicle is established in the at least one first and second brake pressure lines upon each braking event.

27. A brake system as defined by claim 1, in which if there is a failure in a brake pressure line, the directional control valve (9) is triggered upon each braking event such that pressure is built up rapidly.

28. A brake system as defined by claim 27, in which a failure of said at least one first and second brake pressure line is recognized by a response of a brake fluid level switch (27).

29. A brake system as defined by claim 1, in which a pulsing element (36) does not trigger the at least one first directional control valve (9) during an ABS control event.

* * * * *